United States Patent [19]
Hebert

[11] 3,773,372
[45] Nov. 20, 1973

[54] COMBINATION JACKING AND RESILIENT BUCKLING COLUMN BUMPER SYSTEM

[75] Inventor: Victor F. Hebert, San Jose, Calif.

[73] Assignee: Houdaille Industries, Inc., Buffalo, N.Y.

[22] Filed: Apr. 22, 1971

[21] Appl. No.: 136,374

[52] U.S. Cl. .................................... 293/89, 293/86
[51] Int. Cl. ............................................. B60r 19/08
[58] Field of Search .................... 293/70, 85, 86, 89

[56] References Cited
UNITED STATES PATENTS

| 3,172,268 | 3/1965 | Gensheimer | 61/48 |
| 1,813,517 | 7/1931 | Thomas | 293/89 |

*Primary Examiner*—Gerald M. Forlenza
*Assistant Examiner*—Robert Saifer
*Attorney*—Hill, Sherman, Meroni, Gross & Simpson

[57] ABSTRACT

An energy storing body has a resilient portion of substantial length capable of resilient energy-storing buckling deflection responsive to force applied thereto effecting shortening of a straight line distance between opposite ends of the bar, and a second substantial length rigid portion substantially reinforced against buckling deflection and capable of transmission of the force to the resilient portion of the bar.

In a bumper system, the rigid portion of the bar is attached to and adapted to receive impact force from the bumper and the resilient portion of the bar is supported on and in relation to a supporting structure such as the vehicle frame in a manner to buckle resiliently for energy storing in response to bar-shortening impact force causing deflection of the bumper toward the frame.

10 Claims, 5 Drawing Figures

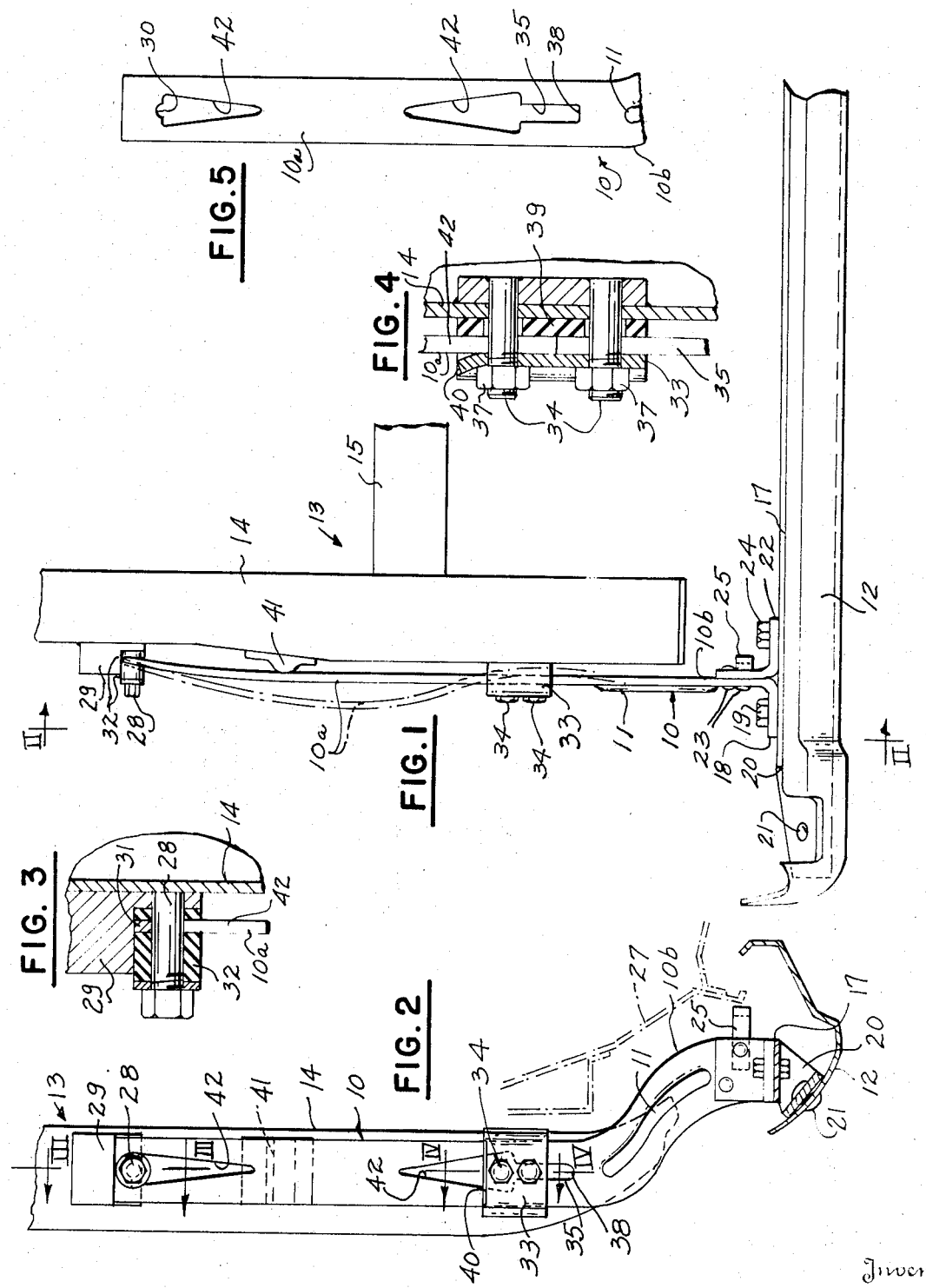

COMBINATION JACKING AND RESILIENT BUCKLING COLUMN BUMPER SYSTEM

This invention relates to energy storing bar structure, and is more particularly concerned with such a structure especially useful in mounting automobile bumpers in a manner to protect them against damage from at least the numerous minor collisions to which vehicle bumpers are subjected in the running of the vehicles.

Any moving object develops a certain kinetic energy level proportional to its speed or velocity squared. When the moving object impacts against another moving object or a non-moving object, this kinetic energy must be dissipated and this may occur by deformation of structure or by being stored or absorbed, for example, in a bumper system.

Relating the foregoing specifically to automotive vehicles, and more particularly to automobiles, excessive damage to not only the bumpers but also the adjacent portions of the vehicles has been experienced in respect to present-day bumper designs which have, to a large extent, become mainly decorative trim for the vehicles. Further, it is generally known that in the automobile industry designers are extremely reluctant to sacrifice any styling potentialities, so that there has been a wide drift away from and a virtual impossibility to return to the rugged spring bumpers of an earlier day when the bumpers themselves were generally constructed to absorb rather significant impacts without damage either to the bumpers or to the associated vehicle structure. For reasons of expediency, present-day bumpers are generally constructed of relatively soft steel virtually lacking in spring characteristics and unduly liable to be dented and cracked under rather low impact, and more particularly impacts occurring as low as three miles per hour up to about ten miles per hour of one vehicle relative to another, where the bumpers are mounted in an essentially fixed or rigid manner relative to the vehicle frame. To alleviate this serious present-day damage situation, with damage claims mounting to exorbitant proportions, various expedients have heretofore been proposed, such as constructing the bumpers of fluid-filled resilient tubes, or equipping them with rubber cushions, but such expedients have been largely resisted due to detraction from designer latitude, cost, unattractive appearance and the like. Coiled springs or rubber cushions behind the bumpers have been proposed, but these have been unsatisfactory because they introduce an indesirable spring performance characteristic into the system which is representable by a chart curve showing unduly soft resistance at the beginning of impact, thus requiring excessive travel distance or forces to be effective. A further proposal has been to provide collapsibly yieldable structure in the bumper system, but that requires replacement of the system or parts of the system or a physical resetting after impact. Although hydraulic buffers or dampers are highly efficient and may be used in such systems, they are not as versatile or desirable in respect to the direction of impact force, and they add unreasonable cost to original equipment, especially in medium and low priced automobiles, and automobile purchasers resist the expenditure where offered as optional equipment.

Meanwhile, collision insurance rates have necessarily escalated because of the rising volume and size of damage claims, a significant proportion of which result from relatively minor car-to-car collisions where relative vehicle movement is no more than from about three to ten miles per hour, such as in parking lot maneuvering, start-up situation, and congested traffic incidents. This situation has become so serious that not only has there been an indication by the insurance industry of a willingness to reduce collision premium rates by as much as 20 percent on automobiles which can withstand at least a 3 mile per hour rear end bumper impact and 5 mile per hour front end bumper impact without damage, and Governmental standards have been or are being implemented to this end.

It is to the attainment of the desirable objective of meeting the problems just outlined and to overcoming the deficiencies, defects, inefficiencies, shortcomings and undesirable factors in prior arrangements and proposals that the present invention is directed.

An important object of the present invention is to provide new and improved energy storing means for bumpers which can be produced and installed at low cost and without extensive modification of bumper installed vehicle structure from current designs.

Another object of the invention is to provide new and improved energy storing bumper support means for automobiles adapted to be installed without requiring any extensive modifications from conventional practice.

A further object of the invention is to provide new and improved bumper support means which will satisfactorily store the energy of impacts which would be damaging in the absence of such support structure and which will operate efficiently to return the system to normal functioning condition after release of the impact force.

Still another object of the invention is to provide a new and improved energy absorbing bumper support system which is highly efficient within a limited range of bumper displacement movement.

A still further object of the invention is to provide a new and improved energy storing bar structure capable of not only providing jacking support but also energy storing means for vehicle bumpers in a simple, low cost, easily installed, highly reliable and enduring construction.

Other objects, features and advantages of the invention will be readily apparent from the following description of certain preferred embodiments thereof, taken in conjunction with the accompanying drawings, although variations and modifications may be effected without departing from the spirit and scope of the novel concepts embodied in the disclosure, and in which:

FIG. 1 is a fragmentary plan view of a bumper system embodying features of the invention;

FIG. 2 is a sectional elevational view taken substantially along the line II—II in FIG. 1;

FIG. 3 is an enlarged fragmentary sectional detail view taken substantially along the line III—III of FIG. 2;

FIG. 4 is an enlarged fragmentary sectional detail view taken substantially along the line IV—IV of FIG. 2; and FIG. 5 is a fragmentary side elevational view of the buckling column portion of the bar structure shown in FIG. 2.

According to the present invention, an energy storing bar structure 10 comprises a bar body having a resilient buckling column portion 10a of substantial length capable of resilient energy-storing buckling deflection (compare the full line and dot dash line showing in FIG. 1) responsive to force applied thereto effecting shortening of a straight line distance between the opposite ends of the bar. A substantial length rigid portion 10b of the bar, comprising an integral portion of the bar body generally aligned with the resilient portion 10a, is substantially resistant to buckling deflection and capable of transmission of the force to the resilient portion 10a to effect the energy-storing buckling deflection thereof. Although the bar 10 throughout its length may be constructed of substantially uniform thickness and of the same material, rigidity is adapted to be efficiently imparted to the portion 10b by integral reinforcing means such as so-called crowning or ribbing 11 extending throughout at least the major length of the portion 10b. This prevents resilient buckling within the parameters of the portion 10a while not precluding at least some high energy spring bending as a safety factor.

By way of example, the energy storing bar structure 10 is disclosed and will be described herein primarily as adapted for especially advantageous use in an energy storing bumper support system. To this end, a pair of the bars 10 will be adapted to support a horizontal bumper 12 outboard relative to either the front or rear of a vehicle frame 13 comprising spaced longitudinally extending coextensive frame beam members 14, only one of which has been shown but which is connected in a relatively rigid frame by means of one or more cross bars or beams 15 with a second frame beam 14 of a vehicle undercarriage or chassis. Thus, a pair of the bars 10, one of which is operatively associated with each of the frame beams 14 will be provided to support the bumper 12 on the frame.

Attachment of the bar 10 to the bumper 12 is desirably through a reinforcing member 17 attached to the inboard side of the shell of the bumper 12. For this purpose, the distal end of the rigid portion 10b is provided with a lateral attachment flange 18 secured by means of rivets or bolts 19 to the reinforcing member 17. For end section stability of the bumper 12, an end portion 20 of the reinforcing member is secured thereto as by means of a rivet 21. Rigid fixation with high impact and jacking load capability of the bar portion 10b to the bumper is enhanced by an the additional angular securing flange 22 secured as by means of rivets or bolts 23 to the bar portion 10b and by means of rivets or bolts 24 to the reinforcing member 17. In order to have the bumper 12 located at a proper elevation, although the frame 13 and more particularly the frame beams 14 may be at a lower elevation, the rigid bar portion 10b is desirably constructed of generally ogee curvature extending upwardly and outwardly from juncture with the bar portion 10a which is desirably mounted longitudinally along the outer side of the associated frame beam 14. to eliminate roll between the bumper system and the vehicle body upon impact tending toward such a reaction, an upstanding bracket 25 is desirably rigidly attached at the connection of the flange 22, such as by means of at least one of the bolts 23 and extended to underlying relation to a portion of the body such as a pinch weld portion 27 thereof (FIG. 2).

To enable resilient energy-storing buckling deflection of the bar portion 10a, it is attached to the side of the associated frame member 14 in such a manner that while full vertical support relationship is maintained, freedom for resilient energy storing buckling of the portion 10a is provided for. To this end, the portion 10a extends substantially straight, is of sufficient length to attain the energy storing capability intended, and is disposed with its width extending vertically, in common with the relatively rigid portion 10b. At its inboard end, the bar portion 10a is anchored in a generally fixed relation to the frame member 14 by suitable means such as a bolt 28 which may secure the inboard end portion rigidly, but in this instance it is shown as securing such end portion with a capability of pivoting about a vertical thrust bearing axis on and against abutment means in the form of a rigid block 29 secured as by welding to the frame member 14. To enable the rocking thrust pivoting of the bar end portion, a bolt clearance hole 30 is provided which is substantially wider in the outboard direction adjacent to the bolt and the bolt head and more particularly a washer 31 so as to clear the same when under maximum buckling stress, with rubber cushioning means 32 interposed between the washer 31 and the bar and between the bar and the base provided by the block 29. The cushioning material prevents looseness and rattling and is readily yieldable with the pivoting of the associated end of the bar.

Jacking support and reciprocal guiding of the resilient portion 10a of the bar adjacent to juncture with the rigid portion 10b is attained by means of a generally U-shaped bracket 33 which is rigidly mounted on the side of the outboard end portion of the frame member 14 substantially spaced from the abutment 29 and through which the outboard end area of the bar portion 10a extends in slidable relation. Thereby, on inboard displacement of the bumper 12 toward the frame 13, the area of the bar within the bracket 33 is guided to slide inwardly with resilient column buckling deflection of the bar portion 10a between the bracket 33 and the abutment 29, substantially as shown in FIG. 1. Additional vertical support for the bar 10 and means for attachment of the bracket 33 to the frame member 14 comprise one or more, and in this instance, a pair of weldnuts, bolts or studs 34 which are Suitably secured to the frame member along the longitudinal axis of the bar portion 10a and extend through a longitudinal guide slot 35 in the bar, and have their outer ends projecting from the bracket 33, with nuts 37 driven in securing relation against the bracket. Not only does the guide slot 35 engage in sliding supporting relation with the studs 34, but its outboard end provides a stop 38 limiting inboard travel of the bar to the desired energy storing stroke. For sound-proofing and rattle-free snugness of the assembly, a rubber type cushioning panel 39 is desirably engaged between the bar portion 10a and the frame member 14 (FIG. 4). To accommodate flexing of the bar portion 10a, the inboard edge portion of the bracket 33 is desirably provided with a generally out-turned or flared lip 40.

In order to avoid binding of the resilient buckling column bar portion 10a by improper bowing deflection toward the frame member 14, means are provided for biasing the same in the direction of desired buckle, that is, outwardly, as shown. Such means may comprise prebowing the bar or, as shown, provision of a biasing deflection ridge 41 projecting outwardly on the frame member 14 about midway the length of the bar portion 10a and thrusting the same into a slight prebow in the desired deflectional direction. Proper deflecting of the bar portion 10a is also improved and controlled by means such as generally lanceolate or teardrop extensions 42, respectively, of the slots 30 and 35, substantially as shown in FIGS. 2 and 5.

Suitable construction of the bars 10 in an automobile bumper system to afford the desired resilient bowing of the buckling column 10a in each instance within the elastic limits calculated to resist the full range of permissible movement between the bumper and the frame, with efficient return to normal position when impact pressure is relieved, is attained by making the same from a suitable spring material such as spring steel which, for example, may be SAE 1060 to 1080 steel, heat treated after formation to attain substantially bainite characteristics with a degree of toughness, strength nd resilience. Typically, the bars 10 may be of about one-eighth inch to 0.4 inch by 3 inches to 6 inches cross-section, and with the length of the bars up to about 42 inches in length.

The bars are mounted in such a manner that their length is shortened by resilient buckling of the buckling portion 10a upon impact of the bumper. All force transmission to the bars is through their ends, and not crosswise to the bars. Therefore, the bars do not act the same as springs to which force is applied in the manner of a lever such that the action is relatively soft initially and then gradually builds up to maximum resistance. Contrary to the action of a spring, the buckling column portions of the bars resist deflection relatively constantly throughout their range of deflectable resilience while storing energy and then release the energy in the same uniform manner. Whereas in the illustrated example, the bar 10 is shown as a single member, for some purposes it may be desirable to provide a laminated bar structure wherein coextensive bar members are cooperatively joined in face-to-face relation.

By the operative attachment of the bars 10 to the sides of the frame members 14, impact against the bumper transverse to the vehicle is transferred through the bars 10, or more specifically by the bar 10 at the side of the frame member 14 toward which the impact force is exerted, to the frame by virtue of the close relationship of the bars to the sides of the frame.

It will be understood that variations and modifications may be effected without departing from the spirit and scope of the novel concepts of this invention.

I claim as my invention: my

1. In an assembly including a bumper and a support therefor toward which the bumper is displaceable:
   energy storing resilient buckling column bars connecting said bumper and said support, each of said bars having a substantially rigid outboard portion and a resilient buckling column inboard portion of substantial length capable of resilient energy-storing buckling deflection responsive to force applied thereto effecting shortening of a straight line distance between opposite ends of the bar;
   means securing the rigid portion rigidly to the bumper; and
   means connecting the resilient portion to the support providing an inboard end abutment for the resilient portion and a supporting guide for the resilient portion adjacent the juncture with the rigid portion.

2. An assembly according to claim 1, said supporting guide comprising a bracket within which an area of the resilient bar portion adjacent the juncture with the rigid portion is slidably engaged.

3. An assembly according to claim 1, including reinforcing means on said rigid bar portion.

4. An assembly according to claim 1, said rigid bar portion being of generally ogee shape to support the bumper at a different elevation than the elevation of the support.

5. An assembly according to claim 1, said means rigidly connecting the rigid bar portion to the bumper comprising a terminal flange on the rigid bar portion, and a supplemental angle flange secured to the bumper and to the rigid bar portion adjacent to said terminal flange.

6. An energy storing bar structure, comprising:
   a bar body having a resilient buckling column portion of substantial length capable of resilient energy-storing buckling deflection responsive to force applied thereto effecting shortening of a straight line distance between opposite ends of the bar; and
   a substantial length relatively rigid portion of the bar substantially resistant to buckling deflection and capable of transmission of said force to said resilient portion;
   said resilient bar portion having a longitudinal slot in the area thereof adjacent to said rigid bar portion;
   said slot having a portion thereof adapted for cooperation with guiding means and another portion thereof adapted to control resilient deflection of the bar.

7. In an assembly including spaced members which are relatively movable toward one another.
   an energy storing bar structure comprising a bar body having a resilient buckling column portion of substantial length capable of resilient energy-storing buckling deflection responsive to endwise force applied thereto effecting shortening of a straight line distance between opposite ends of the bar; and
   another substantial length portion of the bar being substantially resistant to buckling deflection and capable of transmission of said endwise force to said resilient portion;
   means attaching respective opposite end portions of the bar to said members and the bar thereby normally maintaining said members in spaced relation; and
   a supporting guide slidably engaging said resilient portion adacent the juncture thereof with the substantially resistant portion of the bar.

8. An assembly according to claim 7, including a longitudinal rib reinforcing said resistant bar portion.

9. An assembly according to claim 8, including means enhancing the resiliency of said resilient bar portion.

10. An assembly according to claim 7, including means enhancing the resiliency of said resilient bar portion.

* * * * *